US012620009B2

(12) United States Patent
Stang et al.

(10) Patent No.: US 12,620,009 B2
(45) Date of Patent: May 5, 2026

(54) METHOD AND SYSTEM FOR ARTIFICIAL INTELLIGENCE-BASED GENERATION OF TRAVEL AND DINING REVIEWS

(71) Applicant: JPMorgan Chase Bank, N.A., New York, NY (US)

(72) Inventors: Christopher Stang, Malibu, CA (US); Jessica Staddon, Redwood City, CA (US); Jonathan Lalima, Manalapan, NJ (US); Hillary Reinsberg, Brooklyn, NY (US); Janko Bazhdavela, Mamaroneck, NY (US); Ricardo Mela, Hartsdale, NY (US); Vineeth Ravi, Jersey City, NJ (US); Simran Lamba, Manhattan, NY (US); Katie Hainsey, New York, NY (US); Kevin Bichoupan, Great Neck, NY (US); Allison Beer, Bronxville, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 103 days.

(21) Appl. No.: 18/424,210

(22) Filed: Jan. 26, 2024

(65) Prior Publication Data

US 2024/0338737 A1     Oct. 10, 2024

Related U.S. Application Data

(60) Provisional application No. 63/457,950, filed on Apr. 7, 2023.

(51) Int. Cl.
*G06Q 30/0282* (2023.01)
*G06Q 50/12* (2012.01)

(52) U.S. Cl.
CPC ......... *G06Q 30/0282* (2013.01); *G06Q 50/12* (2013.01)

(58) Field of Classification Search
None
See application file for complete search history.

(56) References Cited

U.S. PATENT DOCUMENTS

| | | | | |
|---|---|---|---|---|
| 2008/0154883 A1* | 6/2008 | Chowdhury | .......... | G06F 3/0482 |
| | | | | 707/999.005 |
| 2010/0050118 A1* | 2/2010 | Chowdhury | .......... | G06F 3/0482 |
| | | | | 715/810 |

(Continued)

OTHER PUBLICATIONS

D. S. Susanto, E. Halim, Richard, A. Gui and Nelly, "Resolving Artificial Intelligence Hallucination in Personalized Adaptive Learning System," 2023 Eighth International Conference on Informatics and Computing (ICIC), Manado, Indonesia, 2023, pp. 1-6, doi: 10.1109/ICIC60109.2023.10382000. (Year: 2023).*

*Primary Examiner* — Laura Yesildag
(74) *Attorney, Agent, or Firm* — Greenblum & Bernstein, P.L.C.

(57) ABSTRACT

Systems and methods for using an artificial intelligence-based technique for automatic generation of travel and dining reviews are provided. The method includes: receiving a request for a review of an entity that provides a service to a user; applying a first artificial intelligence (AI) algorithm to the received request in order to generate the review of the entity; and outputting the review of the entity. The entity provides either or both of a travel-related service and a dining-related service, and as such, the entity may include a restaurant or a hotel. The AI algorithm may use a large language model and/or may be trained such that the review has a style and a tone of a Zagat review.

18 Claims, 4 Drawing Sheets

(56) References Cited

U.S. PATENT DOCUMENTS

| 2015/0112981 | A1* | 4/2015 | Conti | ................. | G06F 16/9538 |
| | | | | | 707/730 |
| 2015/0161686 | A1* | 6/2015 | Williams | ........... | G06Q 30/0282 |
| | | | | | 705/347 |
| 2015/0235281 | A1* | 8/2015 | Jain | ................... | G06Q 30/0282 |
| | | | | | 705/347 |
| 2016/0267377 | A1* | 9/2016 | Pan | ...................... | G06N 3/0499 |
| 2023/0086653 | A1* | 3/2023 | Zykh | ................. | G06Q 30/0282 |
| | | | | | 705/347 |

* cited by examiner

400

METHOD AND SYSTEM FOR ARTIFICIAL INTELLIGENCE-BASED GENERATION OF TRAVEL AND DINING REVIEWS

CROSS-REFERENCE TO RELATED APPLICATIONS

This application claims the benefit of U.S. Provisional Patent Application Ser. No. 63/457,950, filed Apr. 7, 2023, which is hereby incorporated by reference in its entirety.

BACKGROUND

1. Field of the Disclosure

This technology generally relates to systems for and methods of using an artificial intelligence-based technique for generating travel and dining reviews.

2. Background Information

Consumers rely on reviews of a wide variety of products and services to assist them in assessing whether a particular product or service is worthy of purchase, and also in assessing the value of the product or service with respect to cost. In the case of consumer services relating to travel and dining, such as, for example, restaurants, hotels, and various types of tourist attractions, such reviews have traditionally been produced by obtaining submissions from individual persons that have had an experience that relates to the travel or dining service, and then relying on editorial personnel to develop a review that is based on a collective judgment that corresponds to the submissions.

However, this process is manually intensive and relatively cumbersome, and therefore, may also suffer from various shortcomings, such as being susceptible to quickly becoming outdated. In addition, given the ever-increasing numbers of restaurants and hotels and other travel-related entities, the scale and capacity that is required for generating such reviews with accuracy and fidelity is not satisfied with the traditional approach.

In view of the above, there is an unmet need for systems and methods of using an artificial intelligence-based technique for automatic generation of travel and dining reviews.

SUMMARY

The present disclosure, through one or more of its various aspects, embodiments, and/or specific features or sub-components, provides, inter alia, various systems, servers, devices, methods, media, programs, and platforms for using an artificial intelligence (AI)-based technique for automatic generation of travel and dining reviews. The various aspects, embodiments, features, and/or sub-components provide optimized processes of using an artificial intelligence-based technique for automatic generation of travel and dining reviews.

According to an aspect of the present disclosure, a method for generating a review is provided. The method is implemented by at least one processor. The method includes: receiving, by the at least one processor, a request for a review of an entity that provides a service to a user; applying, by the at least one processor, a first artificial intelligence (AI) algorithm to the received request in order to generate the review of the entity; and outputting, by the at least one processor, the review of the entity. The entity provides at least one from among a travel-related service and a dining-related service.

The entity may include at least one from among a restaurant and a hotel.

The first AI algorithm may be configured to use at least one from among a sentiment analysis technique, a parts-of-speech (POS) tagging technique, and an extractive summarization and ranking technique to generate the review.

The first AI algorithm may be trained to generate the review such that the review has a style and a tone that is imitative of a Zagat review.

The first AI algorithm may be trained by using historical data that includes previously published Zagat reviews.

The first AI algorithm may be configured to use a large language model (LLM) to generate the review.

The method may further include: transmitting at least one message to a user in order to prompt the user to provide a first submission that relates to a first aspect of the at least one from among the travel-related service and the dining-related service; receiving a response to the at least one message; and using the response as an input to the first AI algorithm.

The at least one message may include at least one from among a first message that relates to providing a name and a location of the at least one from among the travel-related service and the dining-related service, a second message that relates to providing at least one stylistic constraint, and a third message that relates to providing at least one example of a review of a different entity to be used as a model.

The method may further include checking the review of the entity to determine whether a hallucination that relates to the first AI algorithm has been included, and when a determination is made that the review of the entity includes a hallucination, modifying the review of the entity to remove the hallucination.

According to another exemplary embodiment, a computing apparatus for generating a review is provided. The computing apparatus includes a processor; a memory; and a communication interface coupled to each of the processor and the memory. The processor is configured to: receive, via the communication interface, a request for a review of an entity that provides a service to a user; apply a first artificial intelligence (AI) algorithm to the received request in order to generate the review of the entity; and output the review of the entity. The entity provides at least one from among a travel-related service and a dining-related service.

The entity may include at least one from among a restaurant and a hotel.

The first AI algorithm may be configured to use at least one from among a sentiment analysis technique, a parts-of-speech (POS) tagging technique, and an extractive summarization and ranking technique to generate the review.

The first AI algorithm may be trained to generate the review such that the review has a style and a tone that is imitative of a Zagat review.

The first AI algorithm may be trained by using historical data that includes previously published Zagat reviews.

The first AI algorithm may be configured to use a large language model (LLM) to generate the review.

The processor may be further configured to: transmit, via the communication interface, at least one message to a user in order to prompt the user to provide a first submission that relates to a first aspect of the at least one from among the travel-related service and the dining-related service; receive, via the communication interface, a response to the at least one message; and use the response as an input to the first AI algorithm.

The at least one message may include at least one from among a first message that relates to providing a name and a location of the at least one from among the travel-related service and the dining-related service, a second message that relates to providing at least one stylistic constraint, and a third message that relates to providing at least one example of a review of a different entity to be used as a model.

The processor may be further configured to check the review of the entity to determine whether a hallucination that relates to the first AI algorithm has been included, and when a determination is made that the review of the entity includes a hallucination, modify the review of the entity to remove the hallucination.

According to yet another exemplary embodiment, a non-transitory computer readable storage medium storing instructions for generating a review is provided. The storage medium includes executable code which, when executed by a processor, causes the processor to: receive a request for a review of an entity that provides a service to a user; apply a first artificial intelligence (AI) algorithm to the received request in order to generate the review of the entity; and output the review of the entity. The entity provides at least one from among a travel-related service and a dining-related service.

The entity may include at least one from among a restaurant and a hotel.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
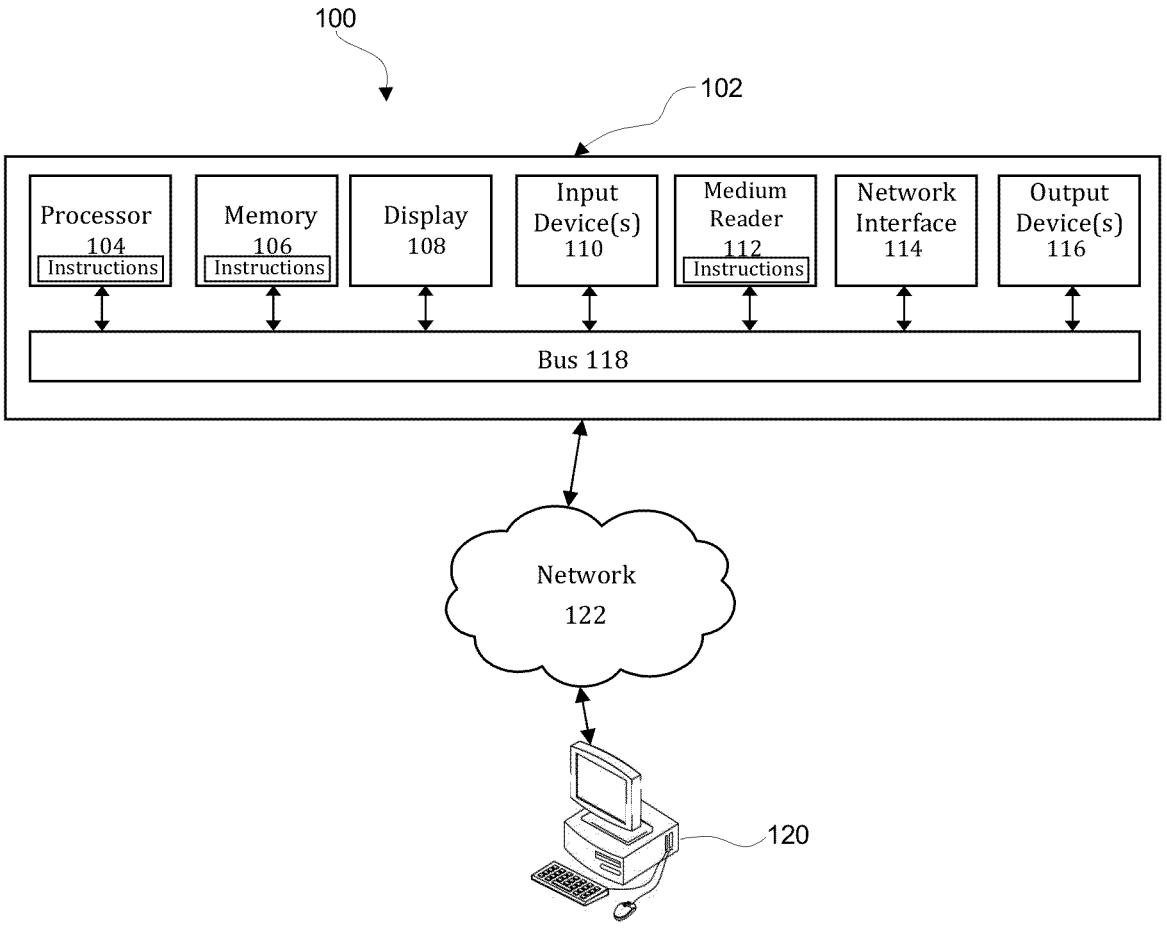
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a video display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of using an artificial intelligence (AI)-based technique for automatic generation of travel and dining reviews.

Figure 2:
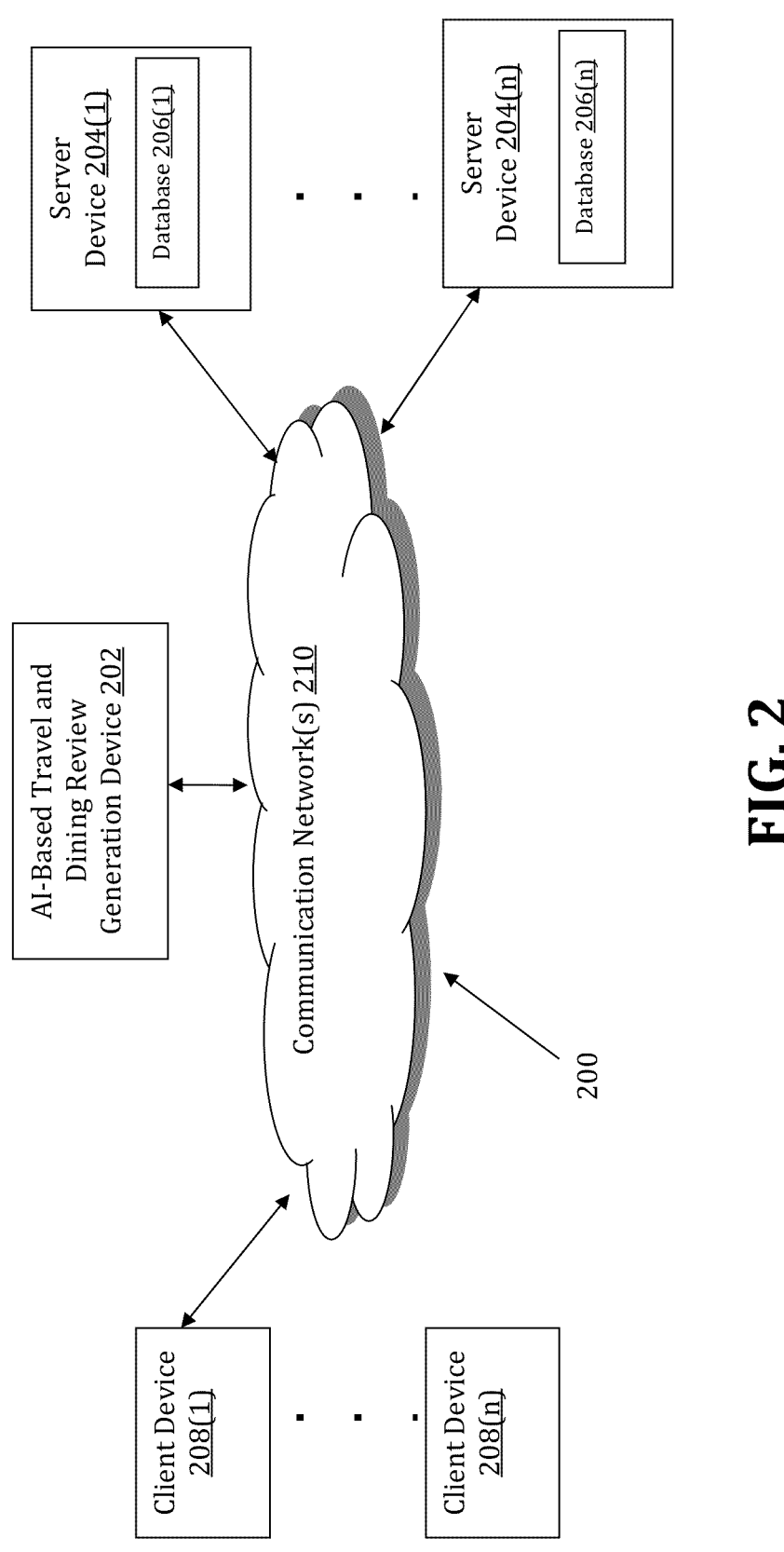
FIG. 2 illustrates an exemplary diagram of a network environment.

Referring to FIG. 2, a schematic of an exemplary network environment 200 for implementing a method for using an AI-based technique for automatic generation of travel and dining reviews is illustrated. In an exemplary embodiment, the method is implemented in a web application that is executable on any networked computer platform, such as, for example, a wireless mobile communication device, i.e., a smart phone.

The use of an AI-based technique for automatic generation of travel and dining reviews may be implemented by an AI-based Travel and Dining Review Generation (AITDRG) device 202. The AITDRG device 202 may be the same or similar to the computer system 102 as described with respect to FIG. 1. The AITDRG device 202 may store one or more applications that can include executable instructions that, when executed by the AITDRG device 202, cause the AITDRG device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the AITDRG device 202 itself, may be located in virtual server(s) running in a cloud-based computing environment rather than being tied to one or more specific physical network computing devices. Also, the application(s) may be running in one or more virtual machines (VMs) executing on the AITDRG device 202. Additionally, in one or more embodiments of this technology, virtual machine(s) running on the AITDRG device 202 may be managed or supervised by a hypervisor.

In the network environment 200 of FIG. 2, the AITDRG device 202 is coupled to a plurality of server devices 204(1)-204(n) that hosts a plurality of databases 206(1)-206(n), and also to a plurality of client devices 208(1)-208(n) via communication network(s) 210. A communication interface of the AITDRG device 202, such as the network interface 114 of the computer system 102 of FIG. 1, operatively couples and communicates between the AITDRG device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AITDRG device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and AITDRG devices that efficiently use an artificial intelligence-based technique for automatic generation of travel and dining reviews.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The AITDRG device 202 may be a standalone device or integrated with one or more other devices or apparatuses, such as one or more of the server devices 204(1)-204(n), for example. In one particular example, the AITDRG device 202 may include or be hosted by one of the server devices 204(1)-204(n), and other arrangements are also possible. Moreover, one or more of the devices of the AITDRG device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the AITDRG device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store historical business-specific information and individual customer reviews that relate to travel and dining establishments.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can facilitate the execution of a web application. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-**208(*n*) may run interface applications, such as standard web browsers or standalone client applications, which may provide an interface to communicate with the AITDRG device 202 via the communication network(s) 210 in order to communicate user requests. The client devices 208(1)-208(*n*)** may further include, among other features, a display device, such as a display screen or touchscreen, and/or an input device, such as a keyboard, for example.

Although the exemplary network environment 200 with the AITDRG device 202, the server devices 204(1)-**204(*n*), the client devices 208(1)-208(*n*), and the communication network(s) 210** are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the AITDRG device 202, the server devices 204(1)-**204(*n*), or the client devices 208(1)-208(*n*), for example, may be configured to operate as virtual instances on the same physical machine. In other words, one or more of the AITDRG device 202, the server devices 204(1)-204(*n*), or the client devices 208(1)-208(*n*) may operate on the same physical device rather than as separate devices communicating through communication network(s) 210. Additionally, there may be more or fewer AITDRG devices 202, server devices 204(1)-204(*n*), or client devices 208(1)-208(*n*) than illustrated in FIG. 2**.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
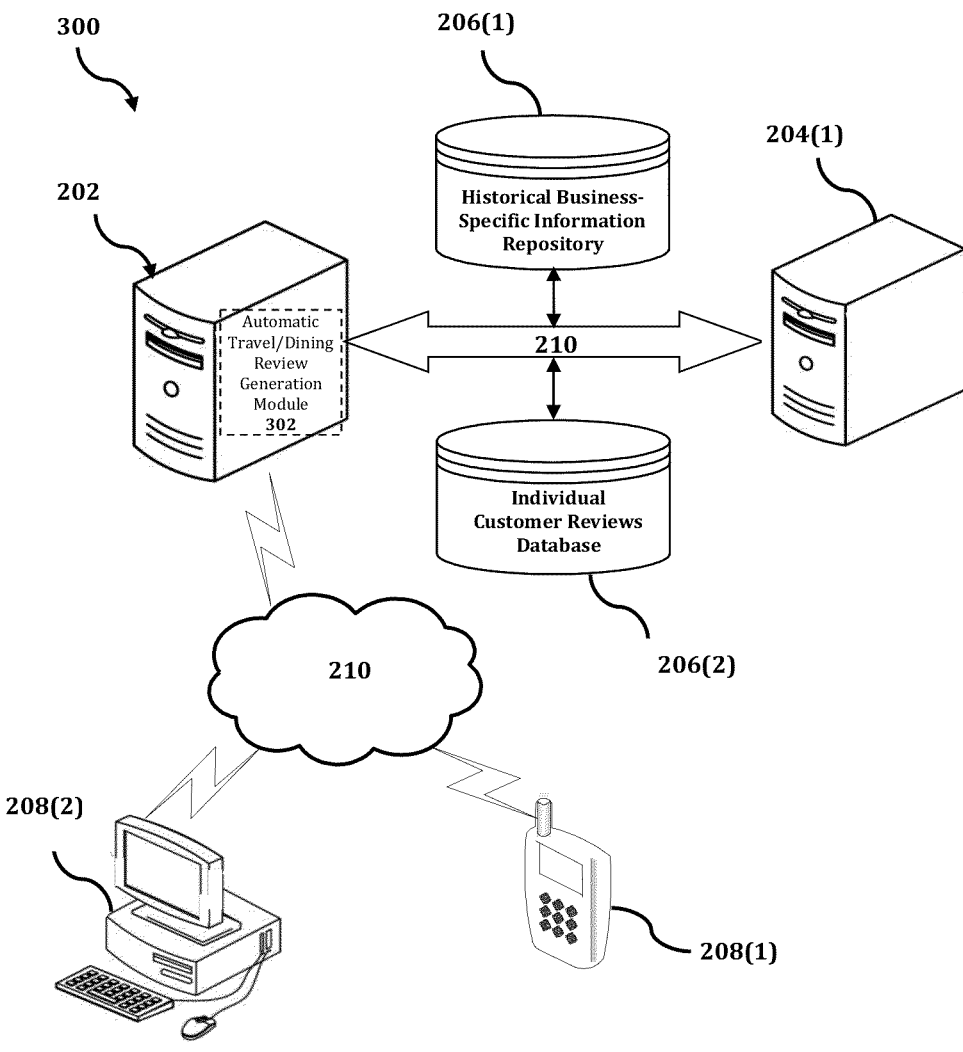
FIG. 3 shows an exemplary system for implementing a method for using an AI-based technique for automatic generation of travel and dining reviews.

The AITDRG device 202 is described and shown in FIG. 3 as including an automatic travel/dining review generation module 302, although it may include other rules, policies, modules, databases, or applications, for example. As will be described below, the automatic travel/dining review generation module 302 is configured to using an AI-based technique for automatic generation of travel and dining reviews in an automated, efficient, scalable, and reliable manner.

An exemplary process 300 for using an AI-based technique for automatic generation of travel and dining reviews by utilizing the network environment of FIG. 2 is shown as being executed in FIG. 3. Specifically, a first client device 208(1) and a second client device 208(2) are illustrated as being in communication with AITDRG device 202. In this regard, the first client device 208(1) and the second client device 208(2) may be "clients" of the AITDRG device 202 and are described herein as such. Nevertheless, it is to be known and understood that the first client device 208(1)

and/or the second client device 208(2) need not necessarily be "clients" of the AITDRG device 202, or any entity described in association therewith herein. Any additional or alternative relationship may exist between either or both of the first client device 208(1) and the second client device 208(2) and the AITDRG device 202, or no relationship may exist.

Further, AITDRG device 202 is illustrated as being able to access a historical business-specific information repository 206(1) and an individual customer reviews database 206(2). The automatic travel/dining review generation module 302 may be configured to access these databases for implementing a process for using an AI-based technique for automatic generation of travel and dining reviews.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the AITDRG device 202 via broadband or cellular communication. Of course, these embodiments are merely exemplary and are not limiting or exhaustive.

Upon being started, the automatic travel/dining review generation module 302 executes a process for using an AI-based technique for automatic generation of travel and dining reviews. An exemplary process for using an AI-based technique for automatic generation of travel and dining reviews is generally indicated at flowchart 400 in FIG. 4.

Figure 4:
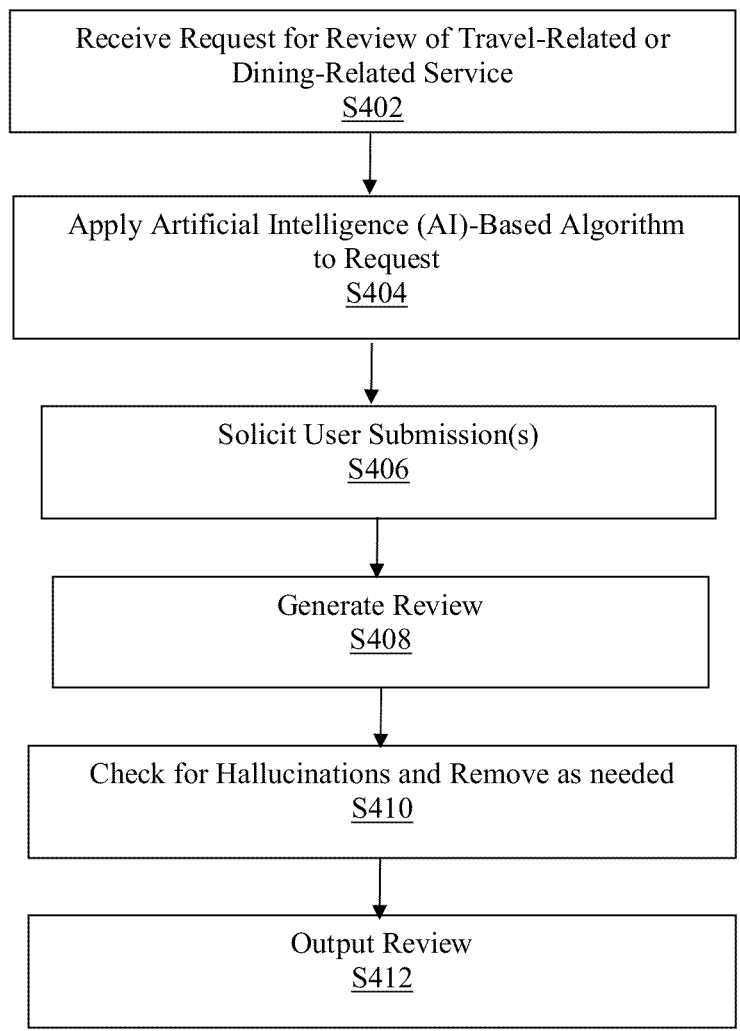
FIG. 4 is a flowchart of an exemplary process for using an AI-based technique for automatic generation of travel and dining reviews.

In the process 400 of FIG. 4, at step S402, the automatic travel/dining review generation module 302 receives a request for a review of an entity that provides a service, such as a travel-related service and/or a dining-related service, to consumers. In an exemplary embodiment, the entity may be a hotel and/or a restaurant.

At step S404, the automatic travel/dining review generation module 302 applies a first AI-based algorithm to the received request. In an exemplary embodiment, the AI-based algorithm is configured to use any one or more of a sentiment analysis technique, a parts-of-speech (POS) tagging technique, and an extractive summarization and ranking technique to generate a review of the entity.

At step S406, the automatic travel/dining review generation module 302 solicits at least one user submission that relates to some aspect of the service that is provided by the entity. In an exemplary embodiment, the solicitation may transpire by the transmission of a message to a user in order to prompt the user to provide the user submission. For example, the message may include any one or more of a first message that relates to providing a name and a location of the at least one from among the travel-related service and the dining-related service, a second message that relates to providing at least one stylistic constraint, and a third message that relates to providing at least one example of a review of a different entity to be used as a model.

At step S408, the automatic travel/dining review generation module 302 generates a review based on the request received in step S402 and responses to the solicitations for user submissions in step S406. In an exemplary embodiment, the review may be generated by using an output of the AI algorithm.

In an exemplary embodiment, the AI algorithm is trained to generate the review such that the review has a style and tone that is imitative of a Zagat review. In this regard, the AI algorithm may be trained by using historical data that includes previously published Zagat reviews. In an alternative exemplary embodiment, the AI algorithm may be configured to use a large language model (LLM) to generate the review.

At step S410, the automatic travel/dining review generation module 302 checks the review to determine whether a hallucination that relates to the AI algorithm is present. If a determination is made that a hallucination is present, then the automatic travel/dining review generation module 302 modifies the review so as to remove the hallucination. Then, at step S412, the automatic travel/dining review generation module 302 outputs the review.

In an exemplary embodiment, an objective is to provide an artificial intelligence (AI)-generated restaurant review which leverages extractive summarization from customer survey responses to extract key information to generate editorialized or improved travel and dining reviews, such as restaurant reviews and hotel reviews that conform to review formats and/or expectations of review platforms. This facilitates a scaling of restaurant review generation by quickly integrating customer reviews and feedback.

In an exemplary embodiment, the restaurant reviews and/or hotel reviews are generated in a manner that is intended to capture a style and method that resembles a specific type of review, such as a review generated from collected and correlated ratings by, and selected quotations from, diners, similar to the style of reviews published by the Zagat Survey ("Zagat").

In this aspect, the present inventive concept relates to using AI algorithms to create reviews that are similar in format, style, tone, and sentiment to reviews that would be published by a known review guide, such as Zagat. This solution facilitates the creation of reviews based on user submissions, which conventionally have generally required manual effort by editorial personnel. The solution effectively creates more scale and capacity to cover more restaurants and hotels with more accuracy and fidelity to required formats than that has been possible previously.

The following is a detailed example of a prompt structure for soliciting user submissions to an AI algorithm that uses an LLM to generate a restaurant review: First, a system prompt asks the user to provide the LLM with context on Zagat review writers and a "role" to play, e.g.: "You are a Zagat restaurant review writer. The reviews that you write feature quotes from customer commentary provided to you and stitch the quotes together into an interesting review that captures the essence of the customer commentary provided." Second, a dynamic master prompt asks the user to give the LLM a task to be completed, including inserting a restaurant name and location, e.g.: "As a Zagat review writer, write four ~75 word restaurant reviews for the restaurant [RESTAURANT NAME] in NEW YORK, NEW YORK supplemented with quotes from the inputs to be provided."

Third, another dynamic master prompt asks the user to provide stylistic constraints to the LLM, e.g.: "1) Review content: Zagat restaurant reviews should speak to the restaurant's location, food, service, and decor/surroundings; and the review must have consistent messaging about food, service, and decor/surroundings. 2) Quote usage: Feature quotes inserted into the review which are surrounded by quotation marks. Use as many quotes from surveyors as possible to generally describe food, decor, service, and prices. Do not take quotes out of context. Do not use quotes about food that are just the name of the dish. For example, 'bologna sandwich' is not allowed but 'fabulous bologna sandwich' is allowed. Use reviewer's funny jokes, quips, puns, and pithy, descriptive comments. For example, 'great food' is not nearly as compelling as calling a place 'a monument to meat' with 'buttery' house-aged beef. 3) General constraints: Refrain from using the restaurant name in the review. Refrain from using the words 'gem', 'authentic', and/or 'foodies'. Only mention a restaurant's location if it is more specific than the city, e.g., do not mention the fact that a restaurant is in New York City, but mention a specific neighborhood or part of town such as 'uptown' or 'far west side'. Avoid repeating words in the same sentence where possible. Only mention a dish in the review once."

Fourth, another dynamic master prompt asks the user to provide examples of real Zagat reviews to be emulated by the LLM, e.g.: "Example Review #1: 'Hipster' carnivores 'leave smiling' from this 'New Age' Williamsburg steakhouse supplying 'mind-blowing' naturally raised beef and 'excellent' sides in 'rustic', brick-lined digs; 'modest prices' make up for the 'daunting' waits caused by the no-reservations policy, though regulars 'kill time' at its neighboring 'sister bar'. Example Review #2: This circa-1975 spot remains 'jam-packed' with 'seen-it-all' locals and other lovers of 'just perfect' 'old-style French' fare served by 'pros' in 'cozy, dim' digs; yes, it is 'cramped' and 'not quiet', but that is all part of the 'charm'—it is an NYC 'institution' that 'should be landmarked'. Example Review #3: 'Steeped in history' and 'romance', this 'historic' Village 'rendez-vous' set in Aaron Burr's former carriage house offers 'excellent' American cuisine delivered by staffers who 'take their job seriously'; 'mood-setting' touches, such as 'candlelit rooms', four fireplaces, and a piano bar, distract from the 'special occasion'-level tabs.

Fifth, another dynamic master prompt asks the user to provide survey responses to the LLM in order to facilitate sourcing of quotes. Sixth, a last dynamic master prompt asks the user to specify a preferred format for an output from the LLM.

In an exemplary embodiment, the system is capable of preserving unique sentiments and/or phrases submitted by users where applicable. In another exemplary embodiment, the system is capable of identifying and removing biases in user reviews.

In an exemplary embodiment, the AI-generated review leverages algorithms and models from Natural Language Processing (NLP) and Machine Learning (ML) algorithms to identify and extract key information such as sentiment, intent themes, ambiance, and context from customer reviews.

In an exemplary embodiment, the methodology is designed to realistically describe key audience segments, i.e., the most important user groups. This helps guide a cross-functional team and stakeholders through key product decisions. The AI system and method generates personas of important users that are based largely on qualitative research inputs. These inputs may include: 1) user segments; 2) user profiles; 3) whether the user is existing or new; 4) demographics; 5) the goal of the task they are trying to complete; and 6) their physical locations, social environments, and technology environments.

Once the personas are created, the algorithm continuously improves the accuracy of persona depiction using machine learning algorithms as more data become available. This process improves the reliability of the personas.

Additionally, the impacts of the generated personas are determined by employing AI/machine learning algorithms based on criteria comprising the following: 1) Background and assumptions: What is the current state of the product, its users, etc.? What is the gap in the product that is motivating this? 2) For a particular product, feature or initiative, what is the big goal, i.e., how will the firm benefit from this? 3) For that same particular product, feature or initiative, what is the little goal, i.e., how will target personas benefit from this? 4) Blend in needs and pains of users and of the firm.

Product/Competitive Landscape: In an exemplary embodiment, other inputs are also provided to the system to improve the quality and accuracy of review generation. These other inputs may include the following: 1) Are there outside industry trends that provide direct, specific, and useful guidance? 2) Are there commercial benchmarks to draw from? 3) How much does this replicate or improve existing methods?

Technical Architecture-Template Approach: In an exemplary embodiment, templates are created and used to measure a baseline performance of automated review generation. The blank phrases within each template are filled by extracting and grouping key intents within each customer by using an Intent Detection. The output from this module is provided as input to the Sentiment Analysis and Parts-of-Speech Tagging modules, which are used to extract the final phrases to fill in the blanks of each template.

Intent Detection: In an exemplary embodiment, a Large Language Model (LLM), such as, for example, "SimCSE", is used to create embeddings verbatims and definitions of each intent. Manual verbatims and synthetic verbatims are generated by an LLM, such as, for example, ChatGPT or Bard, and this process is governed by terms of use that permit such commercial use of the outputs of the LLM.

Unsupervised approach: In an exemplary embodiment, an embedding is created for each customer survey response sentence, and then the top 20 nearest (i.e., most similar) verbatims are identified. A voted ranking measure is used to identify the top several (i.e., between about 2 and 5) intents present. This is scaled this to all customer survey responses.

Supervised approach: In an exemplary embodiment, a supervised machine learning model that acts as a classifier is trained on the verbatims and 80% of the manually labeled examples to detect intents.

In an exemplary embodiment, the performance of each of the unsupervised approach and the supervised approach is measured.

The following provides examples of customer survey responses related to two businesses, Arturo's and ACME, with detected intents: 1) Arturo's: "live jazz, delicious pizza, red booths"; and top two intents: food, relationship. 2) ACME: "relaxed service and vibrant atmosphere with an eclectic crowd"; and top two intents: service, ambience.

Sentiment Analysis: In an exemplary embodiment, TextBlob is used to detect the sentiment of each sentence of a customer survey response to identify positive, negative, and neutral sentiments.

Parts-of-Speech Tagging: In an exemplary embodiment, TextBlob is also used to detect Parts-of-Speech tags, such as noun, pronoun, etc., of words and/or tokens in a sentence.

Extractive Summarization and Ranking: In an exemplary embodiment, PyTextRank is used to extract important phrases from each customer survey response. The phrases are also ranked, and the rankings are then used to fill in the templates.

Generative Approach: In an exemplary embodiment, further improvements in results and quality are realizable by using LLMs such as GPT-J, GPT-3, GPT-4, and/or Bard. Additional generative approaches are used to generate reviews using an LLM in a platform that enables easy build, training, and deployment of machine learning models. This platform is capable of deploying at cloud scale. Additional fine-tuning and knowledge augmentation approaches may be employed to measure performance and quality of results and provide improvements accordingly. AI algorithms may be used for extractive summarization and additional model enhancements.

The following is an example of an original review: Sushi mavens "love how secretish" this "cool" Williamsburg Japanese is, and the "interesting spin" it gives to omakase options and "quality" sushi has earned it a decent reputation; drinks ranging from sake to cocktails make the "casual, quirky" space more palatable, and although "lofty prices" get some reviewers down, the "friendly" staff help ensure that it is "an acceptable spot" for the area, as do the value-priced lunch specials.

Further to the above example, the following is an example of next predicted sentences as generated by an LLM: "Great value" for the money, and "excellent" sushi, but "overly-greasy" rolls and a "weird" selection of sake may keep some diners away. With "amazing" service, "comfortable" seating and a "cheap" price tag, this "hip" Midtown restaurant is a "great option" for Midtown shoppers, "especially" when it is "open late."

Review Generation: In an exemplary embodiment, generative LLMs may be used to more efficiently search for desirable verbatims to include in reviews. In particular, an LLM may be used to generate a candidate review including abstractive and extractive text, i.e., synthetic "verbatims". An identification can then be made of true verbatims that are similar to the synthetic ones by comparing text embeddings of the true embeddings to the synthetic one and choosing a true verbatim that is relatively close in terms of a similarity measure. The final review consists of the abstractive text generated by the LLM with the similar true verbatims in place of the synthetic ones.

Review Validation: In an exemplary embodiment, once a candidate review has been generated, the workflow includes evaluations of the suitability of that review. Some methods indicate a failed review but others may be indicators of success. For example, methods that gauge the humorousness of the review would be a negative indicator, because a humorous review is unlikely to be suitable. As another example, methods that measure the complexity of verbiage used in the level of the review are a positive indicator if the reading level is not too high, as Zagat reviews explicitly aim for an informal/conversational style. Transaction data are used to validate various aspects of the reviews, such as, for example, price level and/or popularity of a restaurant for a client/business meal.

Accordingly, with this technology, an optimized process for using an AI-based technique for automatic generation of travel and dining reviews is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for generating a review, the method being implemented by at least one processor, the method comprising:

receiving, by the at least one processor, a request for a review of an entity that provides a service to a user;

soliciting a user device, by the at least one processor and in response to the receiving of the request for the review, at least user submission data that relates to an aspect of service provided by the entity, wherein the soliciting is performed by automated transmission of at least one message to the user device in order to prompt the user device to provide the at least user submission data;

applying, by the at least one processor, a first artificial intelligence (AI) algorithm to the received request and the at least user submission data in order to generate the review of the entity;

automatically generating, via the first AI algorithm, the review of the entity, wherein the automatically generating includes determining of an intent in the at least user submission data utilized by the first AI algorithm and creating synthetic embeddings verbatims for the determined intent;

checking, by the at least one processor, the automatically generated review of the entity to detect presence of a hallucination by validating the automatically generated review of the entity using one or more transaction data related to the entity;

modifying the automatically generated review of the entity by removing the detected hallucination for improved accuracy of the automatically generated review of the entity; and outputting the modified review of the entity that is absent of the detected hallucination, wherein the entity provides at least one from among a travel-related service and a dining-related service.

2. The method of claim 1, wherein the entity includes at least one from among a restaurant and a hotel.

3. The method of claim 1, wherein the first AI algorithm is configured to use at least one from among a sentiment analysis technique, a parts-of-speech (POS) tagging technique, and an extractive summarization and ranking technique to generate the review.

4. The method of claim 1, wherein the first AI algorithm is trained to generate the review conforming to a target style and a target tone.

5. The method of claim 4, wherein the first AI algorithm is trained by using historical data that includes previously published reviews conforming to the target style and the target tone.

6. The method of claim 4, wherein the first AI algorithm is configured to use a large language model (LLM) to generate the review.

7. The method of claim 1, wherein the automated transmission includes:

transmitting at least one message to the user device in order to prompt the user to provide a first submission that relates to a first aspect of the at least one from among the travel-related service and the dining-related service.

8. The method of claim 7, wherein the at least one message comprises at least one from among a first message that relates to providing a name and a location of the at least one from among the travel-related service and the dining-related service, a second message that relates to providing at least one stylistic constraint, and a third message that relates to providing at least one example of a review of a different entity to be used as a model.

9. A computing apparatus for generating a review, the computing apparatus comprising:

a processor;

a memory; and a communication interface coupled to each of the processor and the memory, wherein the processor is configured to:

receive, via the communication interface, a request for a review of an entity that provides a service to a user;

solicit a user device, in response to the request for the review received, at least user submission data that relates to an aspect of service provided by the entity, wherein the user device is solicited by automated transmission of at least one message to the user device in order to prompt the user device to provide the at least user submission data;

apply a first artificial intelligence (AI) algorithm to the received request and the at least user submission data in order to generate the review of the entity;

automatically generate, via the first AI algorithm, the review of the entity, wherein the review of the entity is automatically generated by determining of an intent in the at least user submission data utilized by the first AI algorithm and creating synthetic embeddings verbatims for the determined intent;

check the automatically generated review of the entity to detect presence of a hallucination by validating the automatically generated review of the entity using one or more transaction data related to the entity;

modify the automatically generated review of the entity by removing the detected hallucination for improved accuracy of the automatically generated review of the entity; and output the modified review of the entity that is absent of the detected hallucination, wherein the entity provides at least one from among a travel-related service and a dining-related service.

10. The computing apparatus of claim 9, wherein the entity includes at least one from among a restaurant and a hotel.

11. The computing apparatus of claim 9, wherein the first AI algorithm is configured to use at least one from among a sentiment analysis technique, a parts-of-speech (POS) tagging technique, and an extractive summarization and ranking technique to generate the review.

12. The computing apparatus of claim 9, wherein the first AI algorithm is trained to generate the review conforming to a target style and a target tone.

13. The computing apparatus of claim 12, wherein the first AI algorithm is trained by using historical data that includes previously published reviews conforming to the target style and the target tone.

14. The computing apparatus of claim 9, wherein the first AI algorithm is configured to use a large language model (LLM) to generate the review.

15. The computing apparatus of claim 9, wherein the automated transmission includes:

transmitting, via the communication interface, at least one message to the user device in order to prompt the user to provide a first submission that relates to a first aspect of the at least one from among the travel-related service and the dining-related service.

16. The computing apparatus of claim 15, wherein the at least one message comprises at least one from among a first message that relates to providing a name and a location of the at least one from among the travel-related service and the dining-related service, a second message that relates to providing at least one stylistic constraint, and a third message that relates to providing at least one example of a review of a different entity to be used as a model.

17. A non-transitory computer readable storage medium storing instructions for generating a review, the storage medium comprising executable code which, when executed by a processor, causes the processor to:

receive a request for a review of an entity that provides a service to a user;

solicit a user device, in response to the request for the review received, at least user submission data that relates to an aspect of service provided by the entity, wherein the user device is solicited by automated transmission of at least one message to the user device in order to prompt the user device to provide the at least user submission data;

apply a first artificial intelligence (AI) algorithm to the received request and the at least user submission data in order to generate the review of the entity;

automatically generate, via the first AI algorithm, the review of the entity, wherein the review of the entity is automatically generated by determining of an intent in the at least user submission data utilized by the first AI algorithm and creating synthetic embeddings verbatims for the determined intent;

check the automatically generated review of the entity to detect presence of a hallucination by validating the automatically generated review of the entity using one or more transaction data related to the entity; and modify the automatically generated review of the entity by removing the detected hallucination for improved accuracy of the automatically generated review of the entity; and output the modified review of the entity that is absent of the detected hallucination, wherein the entity provides at least one from among a travel-related service and a dining-related service.

18. The storage medium of claim 17, wherein the entity includes at least one from among a restaurant and a hotel.

\* \* \* \* \*